United States Patent [19]

Van Houtte

[11] Patent Number: 4,466,640

[45] Date of Patent: Aug. 21, 1984

[54] PULLOUT RESISTANT PIPE COUPLING

[75] Inventor: James J. Van Houtte, Bradford, Pa.

[73] Assignee: Dresser Industries, Inc., Dallas, Tex.

[21] Appl. No.: 290,038

[22] Filed: Aug. 5, 1981

[51] Int. Cl.³ .............................................. F16L 17/02
[52] U.S. Cl. ..................................... 285/104; 285/174;
   285/256; 285/322; 285/382; 285/369
[58] Field of Search ............. 285/104, 105, 382, 382.4,
   285/382.7, 322, 323, 174, 112, 382.2, 364, 256

[56] References Cited

U.S. PATENT DOCUMENTS

| | | | |
|---|---|---|---|
| 3,429,587 | 2/1969 | Kish | 285/18 |
| 3,675,949 | 7/1972 | Dawson | 285/382.2 X |
| 3,790,194 | 2/1974 | Kimberley | 285/382.7 X |
| 3,843,167 | 10/1974 | Gronstedt | 285/105 |
| 3,899,183 | 8/1975 | Wild et al. | 285/104 X |
| 3,915,480 | 10/1975 | Kish et al. | 285/174 |
| 4,018,462 | 4/1977 | Saka | 285/382.7 X |
| 4,229,026 | 10/1980 | Seiler | 285/105 |

FOREIGN PATENT DOCUMENTS

| | | | |
|---|---|---|---|
| 714971 | 8/1965 | Canada | 285/323 |
| 1049585 | 2/1979 | Canada | 285/174 |
| 1297162 | 11/1972 | United Kingdom | 285/369 |

*Primary Examiner*—Dave W. Arola
*Attorney, Agent, or Firm*—Daniel Rubin

[57] ABSTRACT

An improved construction for resisting pipe pullout in a pipe coupling of a type subject to being inwardly swaged in the course of forming a coupled joint. A circumferentially extending lock ring having a plurality of axially spaced chisel shaped teeth on its inward face is inwardly dished about its periphery. The ring is axially located within the coupling shell by an annular inwardly extending protuberance on the inner face of shell interfitting within the dished section of the ring periphery. In response to an imposed swaging force, the coupling shell is constricted inwardly to compress a gasket into sealing engagement with a contained pipe section, while the lock ring is concomitantly constricted inwardly into a gripping interlock therewith.

6 Claims, 5 Drawing Figures

PULLOUT RESISTANT PIPE COUPLING

TECHNICAL FIELD

The technical field to which the invention pertains includes the field of piping and pipe couplings for the formation of pipe joints.

BACKGROUND OF THE INVENTION

The use of couplings and the like for forming pipe joints is well known. It is likewise well known to employ lock rings of sorts in association with the coupling in order to prevent in-service uncoupling of the joint by longitudinal pullout forces which might be imposed on the coupled pipe sections. Exemplifying the latter for use with metal piping is a coupling gasket construction disclosed in Miller U.S. Pat. No. 2,201,372.

Various arrangements and structures of pipe couplings are commercially available. A form of coupling particularly suited for underground gas piping is comprised of a cylindrical sleeve that is inwardly swaged in the course of compressing an annular gasket into sealing engagement about a contained pipe end. Such couplings are commercially available under the trademark POSI-HOLD and generally correspond to the structure disclosed in U.S. Pat. Nos. 3,429,587 and 3,915,480. Another form of swageable coupling likewise marketed under the same trademark is of a structure generally disclosed in Canadian Pat. No. 928,360.

Associated with the coupling construction disclosed in U.S. Pat. No. 3,915,480 is the mentioned pullout problem when coupling pipe of various compositions, most notably steel and plastic, and the government regulations relating to requirements for preventing pipe pullout. Department of Transportation Regulation No. 192.283(b) requires the joint to withstand tensile forces resulting from a temperature differential of 100° F. As proposed in the patent, lock ring inserts contained within the gasket are utilized for the purpose of preventing pipe pullout with one form of insert being more suitable for plastic pipe and another form being more suitable for steel pipe. Operation of the lock ring in that construction is dependent on frictional restraint of the gasket elastomer in combination with an axially extending inclined plane formed on the inner surface of the coupling.

While the foregoing arrangement has worked well with a proven record of commercial success, the goal of meeting governmental standards for pipe pullout prevention with a more universal construction independent of the gasket and alternatively suitable for either plastic or metal pipe, has been long standing. Despite recognition of the problem, a solution therefor has not heretofore been known.

SUMMARY OF THE INVENTION

This invention relates to pipe couplings and more specifically to the swage-type pipe coupling affording an improved construction for improving pipe pullout restraint. In accordance with the invention, this is achieved utilizing a novel lock ring construction which cooperates with an axially located inward protuberance on the coupling to effect a pipe grip in response to an inward swage force improved on the latter. Unlike the prior art construction, the lock ring hereof is operably effective for either plastic pipe or steel pipe, thereby rendering its construction more universal as compared with previous constructions requiring different constructions for each.

To effect the foregoing, a metal lock ring of predetermined circumferential extent is constructed with a serrated gripping surface on its radially innerface formed as annular extending chisel shaped teeth. The outer periphery of the ring is centrally dished inwardly to receive the annular protuberance axially located in the internal diameter of the coupling. In that relation, the protuberance serves both to position the lock ring, and in the course of swaging for effecting a coupled joint, to transmit the swage force to the lock ring for radially constraining the lock ring into a radial grip against the pipe wall thereat.

Since one lock ring is universally suitable for gas pipe of different composition, the previous expense attributed to fabrication and inventory of separate rings for separate purposes in the manner of the prior art is eliminated. At the same time, the imposed pullout restraint is more positive and more readily controllable in becoming effective immediately in the course of swaging, in contrast with the post-coupling effect resulting from an inclined plane in the manner of the prior art.

It is therefore an object of the invention to provide an improved pipe coupling for complying with government standards to restrain coupled pipe against pullout.

It is a further object of the invention to effect the previous object in a swage-type pipe coupling with a lock ring structure affording more universal application to pipes of different composition than previously possible by similar purpose constructions of the prior art.

BRIEF DESCRIPTION OF THE DRAWINGS

Referring now to FIGS. 1 and 2 of the drawings, there is illustrated a deformable swage-type coupling of the general type disclosed in U.S. Pat. Nos. 3,429,587 and 3,915,480. The coupling is generally designated 10 and comprises an elongated tubular shell 11. Formed internally of the shell near each end thereof is a deformable annular arch 12 merging with a radially inward extending recess 13, and which together on their interior face define gasket recesses 14. Contained in the gasket recesses 14 are annular elastomeric gaskets 15 and 16.

Figure 1:
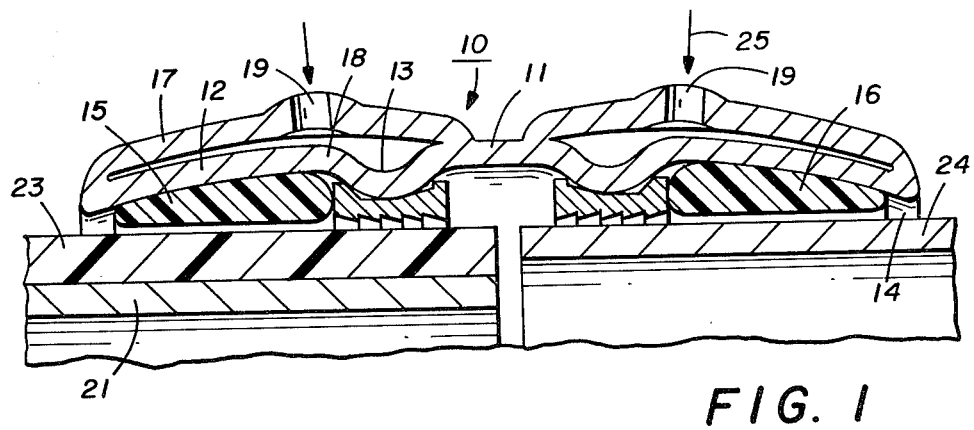
FIG. 1 is a fragmentary section through a pipe coupling construction in accordance herewith in pre-swage relation.

Encircling each end portion of shell 11 is an outer pressure ring 17 secured thereto as by welding or the like. Between the pressure ring and shell there is defined a pressure-tight annular passage 18 formed by the exterior spanned surface thereat of shell 11 and the interior surface of ring 17. Exposing passage 18 to the exterior of ring 17 is a port 19 through which passage 18 can be supplied with a non-compressible fluid under pressure, such as commercially available forms of oil or grease. A forging tool available for that purpose is disclosed in U.S. Pat. No. 3,505,845. Oppositely received within shell 11 are ends of pipe sections 23 and 24 to be coupled, one or the other or both of which can be of steel, plastic, etc.

Figure 2:
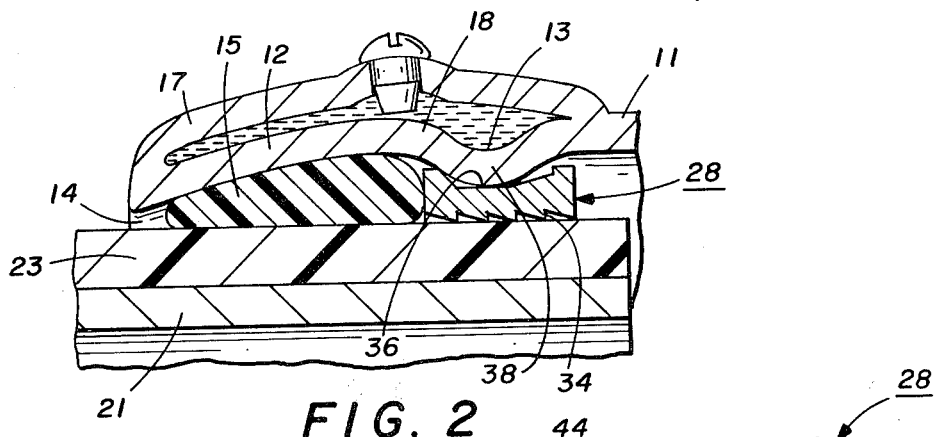
FIG. 2 is an enlarged section generally corresponding to the left-hand portion of FIG. 1 for post-swage relation.
Figure 3:
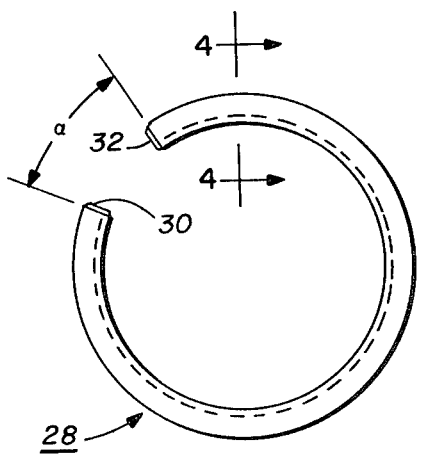
FIG. 3 is a front elevation view of the lock ring.
Figure 4:
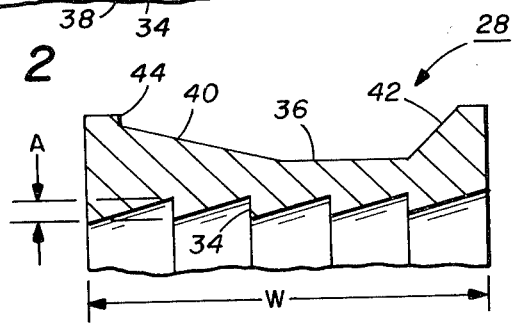
FIG. 4 is an enlarged fragmentary cross-section through the lock ring of FIG. 3 for pipe sizes to 4 inch.

To form the coupled joint, fluid pressure from a source 25 is introduced via thruport 19 such that when sufficient internal pressure is developed, shell 11 constricts radially inward. The forging or swaging is continued until the shell is forged beyond its yield point in compression as to effect a permanent deformation from the relationship of FIG. 1 to the relation shown in FIG. 2 for the latter to provide a firm leak-tight seal between compressed gasket 15 and pipe 23 thereat. For pipe 23 of plastic composition, as shown, there is provided a tubular sleeve 21 of metal or other inelastic material initially increased in the pipe end prior to forming the coupled joint.

For effecting pipe restraint in accordance herewith, there is provided a circumferentially extending lock ring 28, preferably of steel, having an initially controlled circumferential extent less than annular as to define a gap angle α between radial end faces 30 and 32.

Figure 5:
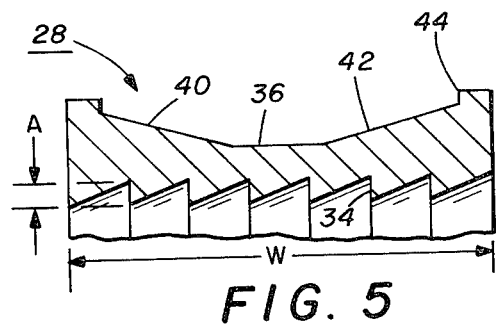
FIG. 5 is an enlarged fragmentary cross-section through the lock ring of FIG. 3 for pipe sizes 4 inch and above.

Transversely extending seriatim across the inner diameter of the ring are a plurality of wedge or chisel shaped teeth 34 comprising the gripping surface thereof. On its top or outer periphery, ring 28 is centrally dished or channeled at 36 in a manner to permit an interfitting placement and retention against inward protuberance 38 formed about the underside of recess 13. The fit of protuberance 38 within ring recess 36 is somewhat critical in that radial clearances therebetween should ensure that radial location of teeth 34 will result in an adequate grip with a contained pipe thereat. Moreover, the chamfered sides 40 and 42 of recess 36 are intended to ensure an enhanced grip against contained pipe in the event any significant pullout force is encountered. Shoulder 44 in FIG. 5 serves to limit pullout travel of ring 28 when drawn outward to an axial engagement against protuberance 38. Angle α is held to a minimum to at least ensure that the opposite squared ends 30 and 32 will butt when a pullout force is encountered. Hardness of the ring should exceed that of steel pipe with which it is to be used. A minimum Rockwell C hardness of 25 has been found suitable by exceeding the hardness of API 5L pipe by about twenty-five percent.

Various factors affect the size, depth and spacing of the teeth 34, which functionally rely on a toothed grip effected by both the swage forces and the pullout forces. Typically, the maximum tooth depth "A" is largely governed by any weakening effect likely to be encountered from cutting through of the plastic pipe wall thickness. On the other hand, minimum tooth depth "A" is determined by the penetration necessary to retain plastic pipe without shearing the O.D. wall at the required tensile load, for a given ring width "W" with a given number of teeth. Increasing the number of teeth, at the same pitch by an increased width "W" of ring 28 enables some decrease in the necessary tooth depth. Within the insert width available, the number of teeth should be limited to prevent a lowering of pullout strength from a shallower tooth penetration resulting from the same collapsing load distributed over more teeth. Similarly, a decrease in the number of teeth 34 can result in a lowering of pullout strength from the load being divided equally among fewer teeth. For 6 inch size, a preferred profile includes seven teeth 34 at about 0.125 inch pitch at a depth "A" of about 0.064 inches. This was found to withstand a tensile load exceeding 31,000 pounds as compared to the D.O.T. standard requirement of 26,200 pounds.

In operation, inward swaging of the coupling shell is pursued separately at each end until an adequate sealing force is imposed on the respective gaskets 15 and 16. Concomitantly therewith, ring 28 is collapsed inwardly. On plastic pipe, ring teeth 34 penetrate the pipe wall almost to their full depth, at which point adequate pullout resisting force is imposed. On steel pipe, the same selective coupling inner shell collapse is encountered, with penetration of ring teeth 34 into the steel pipe being minimal but affording even greater shearing resistance than with the plastic pipe.

By the above description there is disclosed a pipe coupling affording a novel structure for restraining pullout of a coupled pipe section. By means of a novel lock ring structure supportably positioned by an inward protuberance in the coupling wall and responsive to inward swaging thereof, the restraining grip imposed against contained pipe is both positive and controlled without depending on post-coupling effects in the manner of the prior art. Significant to the foregoing is the fact that the lock ring construction hereof enables universal application, in that it is alternatively suitable with pipe compositions of plastic, steel, etc. A major advantage afforded by its more universal use is a reduction in cost compared to the separate purpose lock ring constructions of the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pipe coupling including a radially deformable elongated shell in which to receive a pipe section to be coupled, at least one gasket recess defined interior of said shell in a deformable section thereof and a gasket contained in said recess, the improvement for restraining pullout of a pipe section coupled thereat and comprising:

(a) an inward protuberance defined interior of said shell on a deformable section thereof axially displaced from said gasket recess; and (b) a lock ring having a toothed inner face and including means adapted for positioned placement of the lock ring axially retained against the inner face of said protuberance, said lock ring when positioned placed against said protuberance being responsive to inward deformation of said protuberance to constrict radially inward into a penetrating gripping engagement with a contained pipe section to impose a restraining force on the pipe section sufficient to restrain the pipe section against a predetermined drawbar pull potentially incurred thereby.

2. In a pipe coupling according to claim 1 in which said means on said lock ring comprises a radial recess about its outer periphery to receive said protuberance for positioned placement thereagainst.

3. In a pipe coupling according to claim 2 in which said lock ring is operatively responsive to deformation of said protuberance concomitantly but independent of the deformation imposed by said shell against a gasket contained in said gasket recess.

4. In a pipe coupling according to claim 3 in which the teeth of said lock ring are sharp when viewed in a transverse cross-section thereof, with the quantity and pitch of said teeth being correlated to exceed the drawbar pull to be potentially incurred by the coupled pipe section.

5. In a pipe coupling according to claim 4 in which the hardness of at least said ring teeth is greater than the hardness of a pipe section to be coupled.

6. In a pipe coupling according to claims 2, 3, 4 or 5 in which said lock ring in transverse cross-section includes a portion about its outer periphery juxtaposed to said recess that is of greater radial thickness than the minimum radial thickness of said recess.

* * * * *